Figure 1:
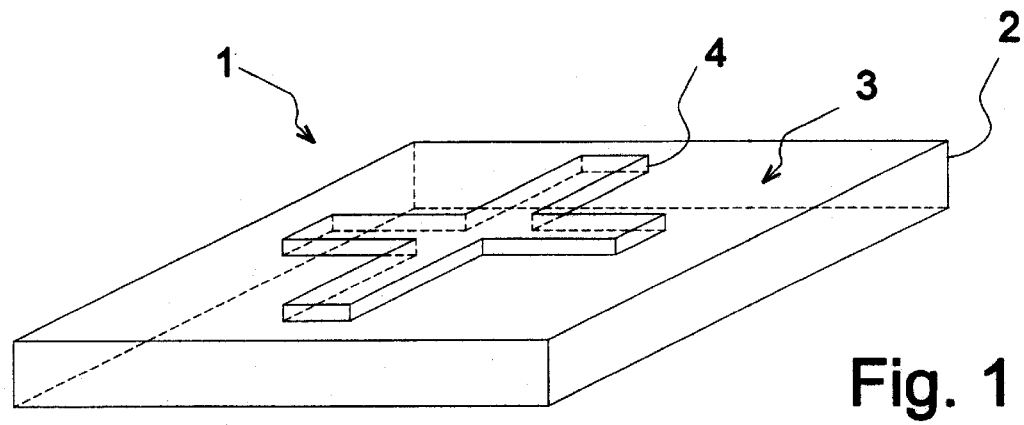

United States Patent
Bruin et al.

[11] Patent Number: 5,965,237
[45] Date of Patent: Oct. 12, 1999

[54] MICROSTRUCTURE DEVICE

[75] Inventors: Gerardus Jacobus Maria Bruin, Basel, Switzerland; Carlo Stefan Effenhauser, Lörrach, Germany; Andreas Helg, Möhlin, Switzerland; Aran Paulus, Heitersheim, Germany

[73] Assignee: Novartis AG, Basel, Switzerland

[21] Appl. No.: 08/954,998

[22] Filed: Oct. 20, 1997

[51] Int. Cl.$^6$ ............................................. B32B 3/00
[52] U.S. Cl. ........................ 428/156; 428/172; 428/178; 428/188; 428/428; 428/447
[58] Field of Search ................... 428/178, 188, 428/447, 156, 137, 167, 172, 192, 428

[56] References Cited

U.S. PATENT DOCUMENTS 5,344,690  9/1994  White et al. ............................ 428/131
5,534,328  7/1996  Ashmead et al. ....................... 428/166

*Primary Examiner*—Donald Loney
*Attorney, Agent, or Firm*—Stephen G. Kalinchak; William K. Wissing

[57] ABSTRACT

An improved microstructure for micro-scale fluid handling, processing and investigation comprises a support element and a microstructured element. The support element has a substantially even support face. The microstructured element has a microstructured face provided both with substantially even portions and with recessed portions. The even portions are substantially coplanar to a common even surface. The recessed portions are defined between the even portions adjacent thereto and recessed from the common even surface. The support face is located substantially adjacent to the microstructured face and cooperates with the recessed portions thereof to define a microchannel system. At least the microstructured element is made and formed of poly(dimethylsiloxane) polymer by applying a prepolymer or a precursor thereof onto a corresponding master element, and then curing the material.

14 Claims, 4 Drawing Sheets

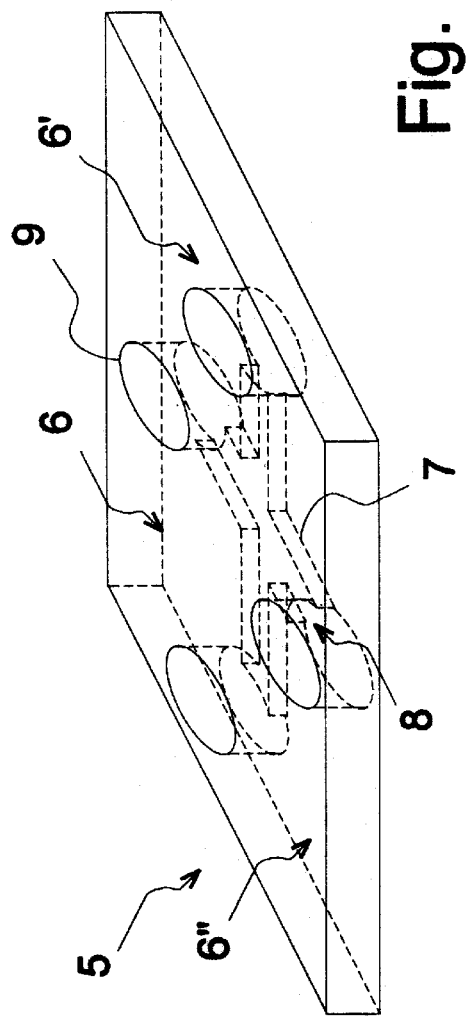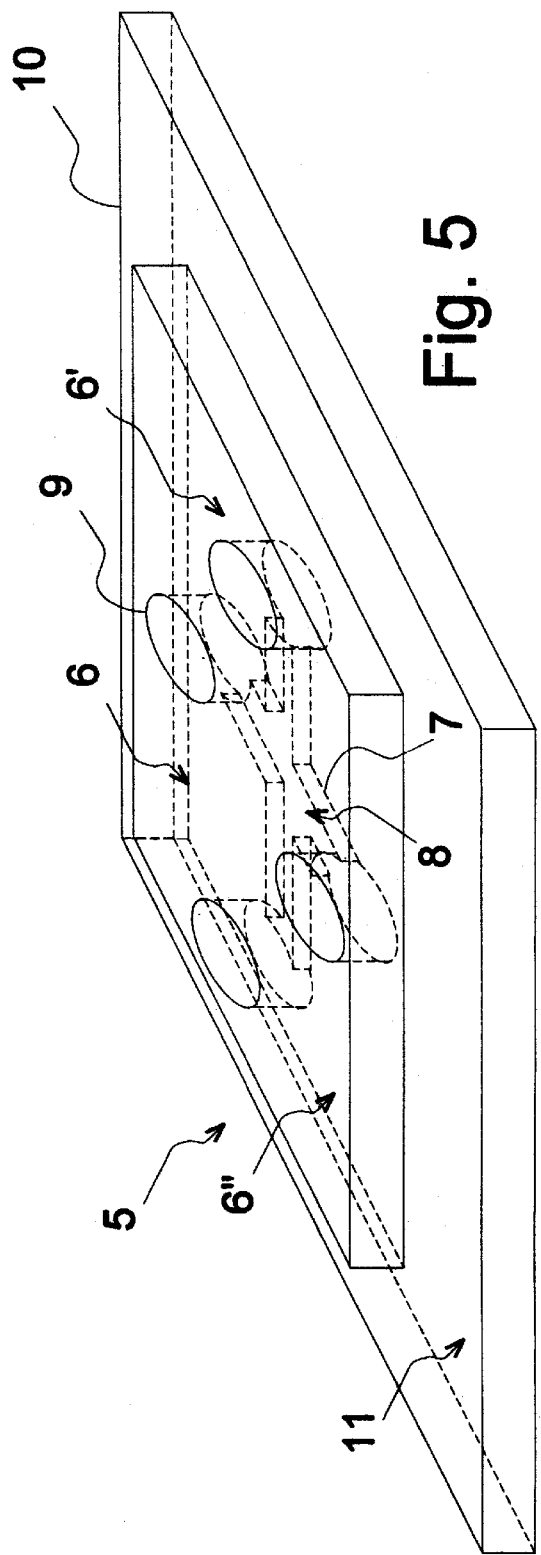

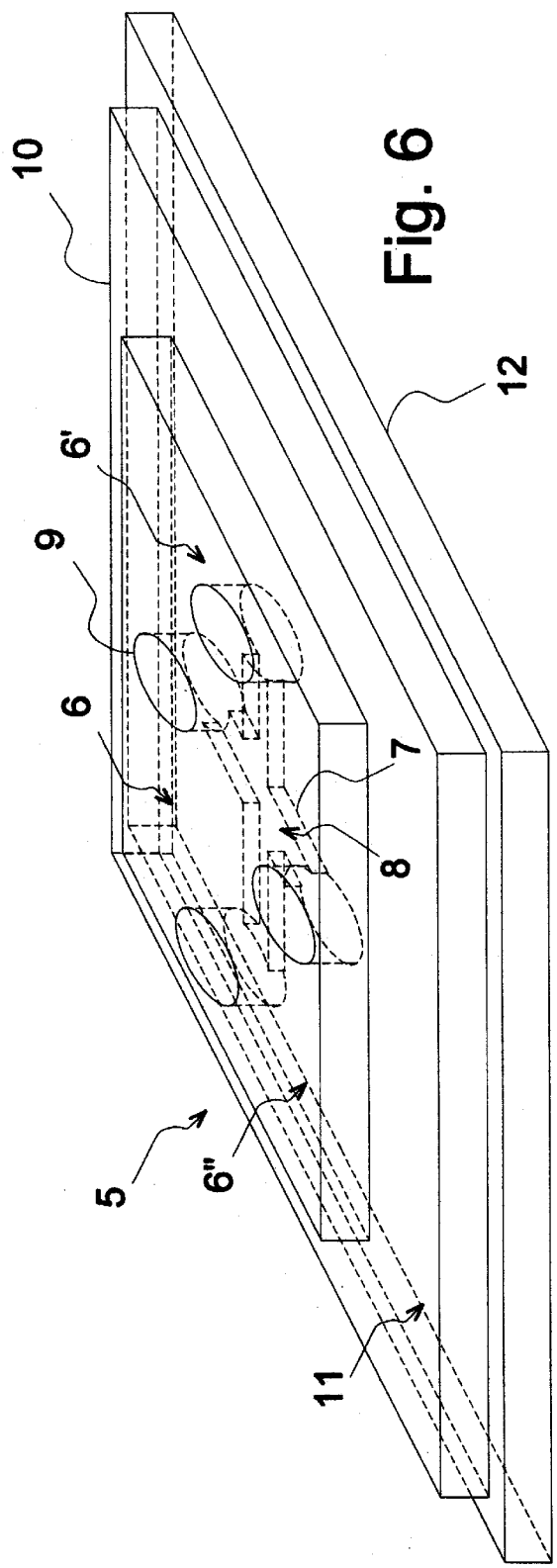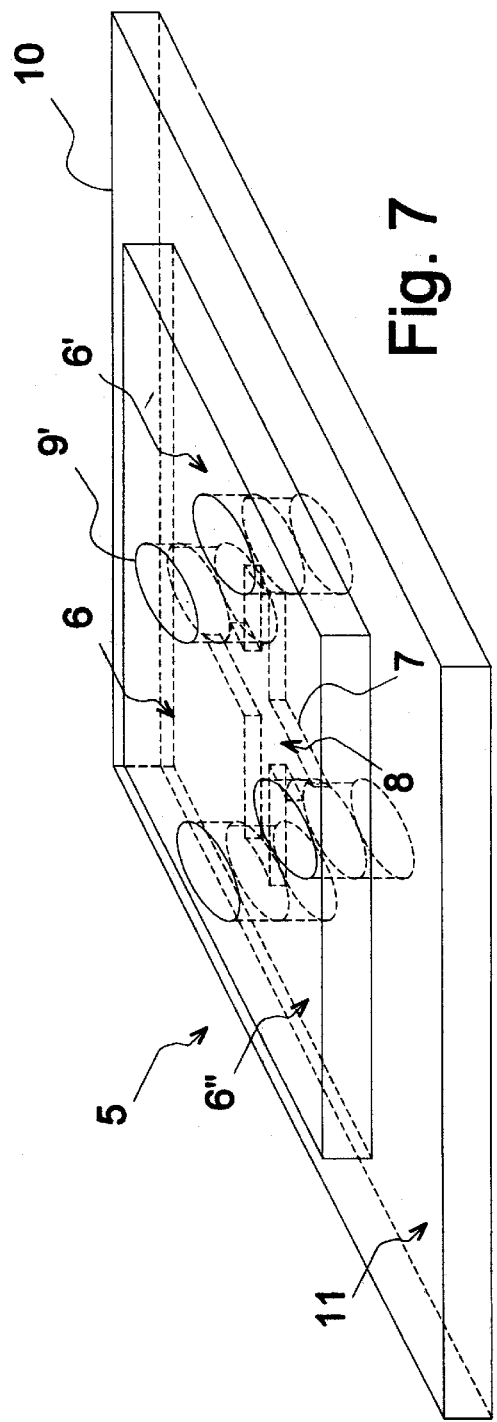

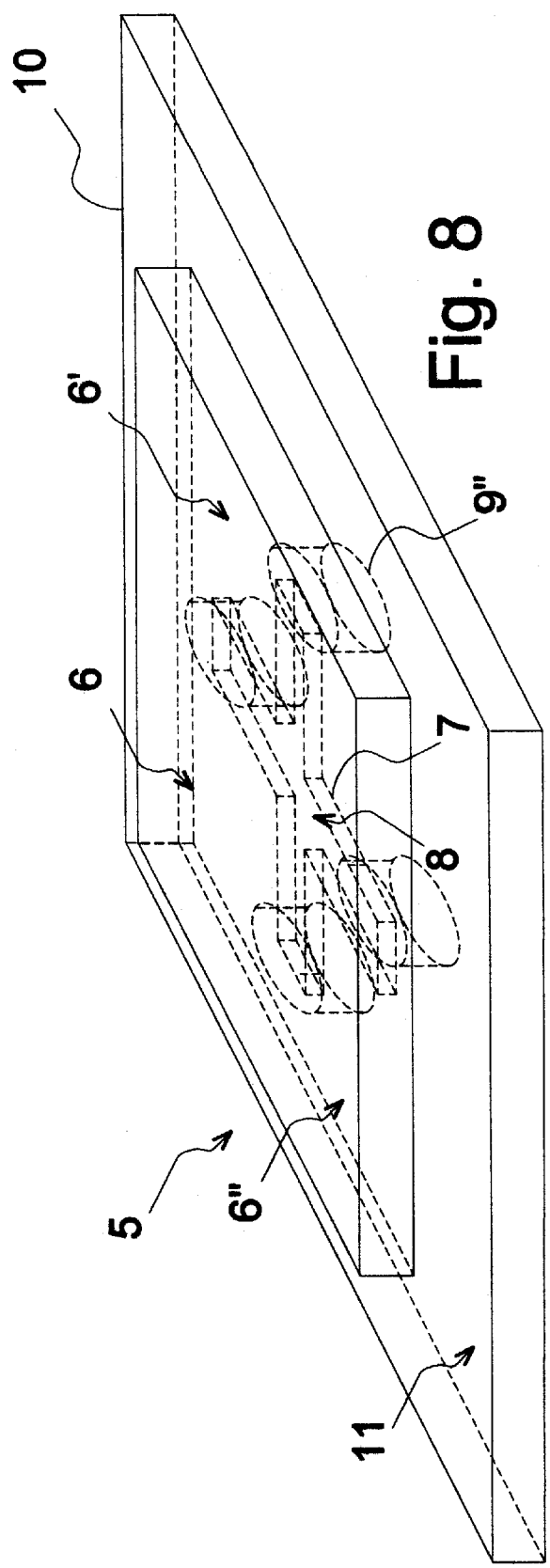

MICROSTRUCTURE DEVICE

This invention relates to microstructured devices for micro-scale fluid handling, processing and investigation adapted for use in the course of analysis or synthesis procedures performed on or requiring microquantities of a fluid such as liquid or gas, more particularly for performing electrophoresis, chromatography, biosynthesis procedures and the like. More specifically, this invention relates to microstructured devices for micro-scale fluid handling, processing and investigation comprising two elements facing each other and having recessed or channel portions defined therebetween to receive the fluid to be handled, processed and investigated.

Miniaturized total chemical analysis systems ($\mu$-TAS) allow to achieve fast separations with high resolution in a miniaturized set-up including sample pretreatment steps such as sample concentration, labeling and digestion with the additional possibility of multiplexing. Successes have been achieved with capillary electrophoresis on chips, and it was hoped that integrated capillary electrophoresis would permit a new level of miniaturization and, by utilizing technologies developed for the computer chip industry, multiplication. Indeed, in recent years a number of functional models of integrated capillary electrophoresis were demonstrated with impressive performance features regarding analysis speed and resolution, the integration of pre- and post-column reactions, and fraction collection. However, a number of critical issues such as the choice of the support material, detection schemes and sensitivity, injection, fluid handling and overall cost still limit the use of these devices in an academic or industrial environment.

Whereas early approaches to capitalize on processing technologies of the chip industry were hampered by unfavorable characteristics of silicon wafer material for electrophoretic experiments, glass and quartz can be micromachined in a similar way as silicon with established and commercially available techniques. The optical properties of glass allow the use of spectroscopic detection schemes such as laser induced fluorescence and even UV detection. Because bulk resistivity and dielectric breakdown field strength are sufficiently high, electric field strengths of several 1000 V/cm can be readily applied in low conductivity buffer solutions. Further a number of surface modification methods are available which can be easily transferred from conventional fused silica capillaries to planar chips. However, the fabrication of a ready-to-use glass device requires a sequence of rather cumbersome steps, such as annealing of the chip to a cover plate typically at 600° C. for several hours, into which reservoir holes have to be drilled in a time and labor intensive way to provide access to the channels. The devices appear to be prone to clogging, yet are difficult to clean and very often have to be discarded after failure. Fabrication costs of such devices are too high for their usage as single-use disposable units.

PCT application WO91/16966 discloses choice of support material by using plastic support materials to form the necessary channel structures. There is disclosed a microfluidic structure of two planar base layers and an intermediate recessed spacing layer which cooperates with at least one of the base layers to define a micro-scale channel system. According to the disclosure, the two base layers and the intermediate spacing layer may be made of the same material, and the intermediate spacing layer may be formed integral with one of said base layers. There is also disclosed a process of making the microfluidic structure by providing a planar master surface with a relief pattern corresponding to the desired spacing layer geometry, forming the spacing layer against the master surface, and then applying the two planar base layers to opposite sides of the spacing layer to complete the micro-scale channel system. The material of the intermediate spacing layer may be a thermoplastic polymer or a cross-linkable polymer, and the spacing layer may be formed by direct pressing against a master surface or by injection into a mold, a surface of which is the master surface. The master surface may be the surface of a single crystal of silicon, and the relief pattern may be produced thereon by etching.

However, the rather large channel dimensions so obtained prevent high resolution, high-speed applications, and the shortcomings of glass devices as substrates for integrated capillary electrophoresis are an incentive to explore alternative materials. In this respect, casting of poly(dimethyl-siloxane) (PDMS) from microfabricated masters has recently found an increasing number of applications, e.g. microfabrication by micromolding in capillaries or by microcontact printing.

With respect to microfabrication by micromolding in capillaries, "Nature" Vol. 376, pp. 581–584 (Aug. 17, 1995) published a letter from E. Kim et al. which discloses a general molding procedure to produce a relief, including the fabrication of a molding master having a planar surface provided with a network of recessed channels. This molding master is fabricated by casting PDMS against a complementary relief structure previously prepared e.g. by photolithographic procedures. The letter discloses that PDMS is an elastomer, the surface of which has a low interfacial free energy allowing it to maintain adhesion to various contacting surfaces. In this way, a PDMS surface can adhere to a curved surface. The PDMS molding master has sufficient elasticity to allow its separation from the complementary relief structure.

With respect to microfabrication by microcontact printing, J. Wilbur et al. published in "Advanced Materials" Vol. 6 No. 7/8 (1994) pp. 600–604 another aspect of making and using a molding master fabricated by casting PDMS against a complementary relief structure previously prepared e.g. by photolithographic procedures.

The disclosures of E. Kim et al. and J. Wilbur et al. only address the fabrication of a molding master and do not suggest any microstructured device for micro-scale fluid handling, processing and investigation.

A polymer precursor of the above-mentioned poly (dimethylsiloxane) (PDMS) is currently available together with its appropriate polymerization catalyst e.g. from Dow Corning Company, Midland (Mich.), U.S.A., under the trademark "Sylgard 184". The actual PDMS polymer can easily be produced by mixing the precursor and the catalyst in a 10:1 ratio and providing for sufficient curing time, e.g. of about 2 to about 8 hours at room or slightly higher temperature.

Accordingly, it is a principal objective of this invention to overcome the above-discussed disadvantages associated with prior microstructured devices and the methods for making them.

In one aspect this invention provides an improved microstructured device of the above-mentioned type comprising a support element having a substantially even support face and a microstructured element having a microstructured face provided both with substantially even portions and with recessed portions, wherein the even portions are substantially coplanar to a common even surface of the microstructured face, the recessed portions are defined on the microstructured face between the even portions adjacent thereto and recessed from the common even surface of the microstructured face into the microstructured element, and the recessed portions do not contact any outer edge of the microstructured element the support face is located substantially adjacent to the microstructured face and cooperates with the recessed portions thereof to define a microchannel system appropriate for micro-scale fluid handling, processing and investigation.

In another aspect this invention provides an improved microstructured device of the above-mentioned type comprising first and second substantially even layers each having a respective contacting face, said contacting faces being substantially adjacent one with another, said contacting face of said first layer being substantially even and said contacting face of said second layer being provided with recesses that cooperate with said contacting face of said first layer to define a microchannel system and the recesses do not contact any outer edge of the second layer.

The improvement of the microstructured device consists in that at least said microstructured element thereof or at least said second layer thereof, respectively, is made and formed of poly(dimethylsiloxane).

This invention overcomes the above-mentioned disadvantages and other disadvantages associated with prior microstructured devices by providing an improved microstructured device for micro-scale fluid handling, processing and/or investigation and also a method of manufacturing a microstructured device of the above-said type.

In one aspect of the method of manufacturing a microstructured device of the above-mentioned type, a microstructured element is provided by casting fluidic preecursors of PDMS against a microstructured face of a microstructured master element having relief portions defined thereon, to result in a cast microstructured element having a microstructured face provided both with substantially even portions and recessed portions, and then placing the microstructured face of the microstructured element substantially adjacent to a substantially even face of a support element, to result in a microstructured device having the support face cooperating with the recessed portions of the microstructured face to define microchannels appropriate for microscale fluid handling, processing and/or investigation.

In another aspect of the method of manufacturing a microstructured device of the above-mentioned type that is a variant of the preceding one, the microstructured element is provided by casting a fluid PDMS precursor against the microstructured face of the microstructured master element and then curing said fluid precursor for conversion thereof to a PDMS polymer.

In still another aspect of the method of manufacturing a microstructured device of the above-mentioned type that is again a variant of the preceding ones, a microstructure is manufactured by providing a substantially even mold surface having a relief pattern corresponding to a desired geometry of recesses, applying a layer in the form of a fluid PDMS precursor against said mold surface, curing said PDMS precursor for conversion thereof to a PDMS polymer, removing said layer from the mold surface, and applying said layer substantially adjacent to another layer with contacting faces substantially adjacent to each other, to complete the desired microchannel system.

Following is a description by way of example only of embodiments of this invention with reference to the accompanying drawings in which FIGS. 1 to 5 illustrate schematically a method of manufacturing a microstructured device according to this invention by showing the progressive build-up and assembly of said microstructured device in successive steps of said fabrication procedure; and FIGS. 6 to 8 illustrate schematically said microstructured device in respective variants of an embodiment thereof.

Corresponding reference characters indicate corresponding parts throughout the several views of the drawings.

In a first microfabrication step, the result of which is illustrated in FIG. 1, a microstructured master element 1 is manufactured in usual manner from a silicon wafer 2 sized 4" in diameter and oriented (100), using a commonly known wet etching process to produce a generally even surface 3 having thereon a surface relief 4. This surface relief 4 is substantially comprised of elongated prismatic relief elements such that the height of the surface relief 4 above the generally even surface 3 is typically in the range between about 10 $\mu$m and about 90 $\mu$m (more particularly about 20 $\mu$m in the embodiment illustrated) and the width of the surface relief 4 between side walls thereof is typically in the range between about 10 $\mu$m and about 50 $\mu$m (more particularly about 30 $\mu$m in the embodiment illustrated). The length of the surface relief 4 i.e. of the side walls thereof may be of any size that can be produced in the silicon wafer 2, e.g. typically in the range between about 1 cm and about 5 cm (more particularly about 1 cm in the embodiment illustrated). Corresponding to the generally prismatic shape of the surface relief 4, the angle between the side walls thereof and the generally even surface 3 is very close to 90°, whereas minor deviations due to the anisotropy of the silicon etching process can occur but may be neglected here.

In order to improve the further use of this master element 1 as a molding template, its effective surface i.e. the surface 3 together with the relief 4 are silanized in a solution of 3% (v/v) dimethyloctadecylchlorosilane and 0.025% (v/v) $H_2O$ in toluene for two hours, which will eventually facilitate peeling off the PDMS replica in a step to be described below. After this silanization, the master element 1 is thoroughly rinsed with toluene and water in succession.

The master element 1 is then carefully cleaned with a stream of dry nitrogen and mounted in a clamp.

Figure 2:
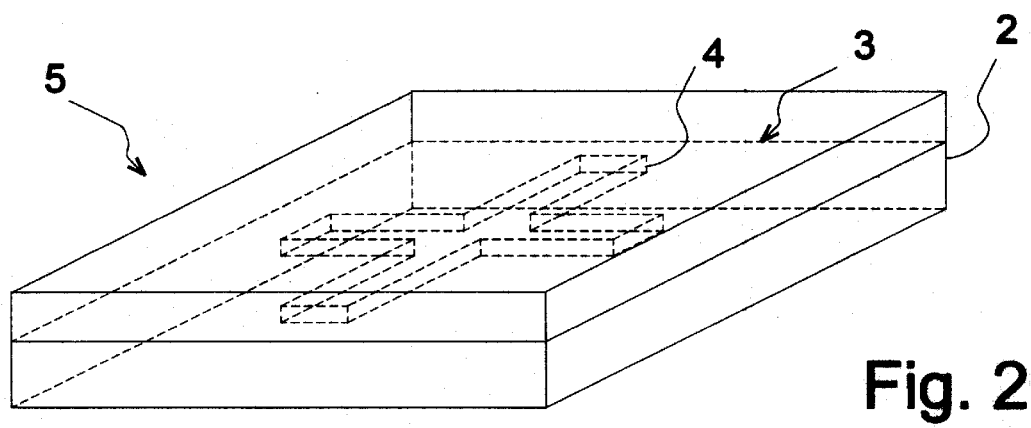

In a second microfabrication step, the result of which is illustrated in FIG. 2, a 10:1 mixture of a polymer precursor of PDMS i.e. poly(dimethylsiloxane) and its curing agent is poured over the effective surface of the master element 1 i.e. the surface 3 together with the relief 4. Typically, there can be used a PDMS product currently available from Dow Corning Company, Midland (Mich.), U.S.A., under the trademark "Sylgard 184". The PDMS precursor is then cured for 4 h at 65° C. to form a polymeric PDMS layer 5 adjacent to the master element 1.

Figure 3:
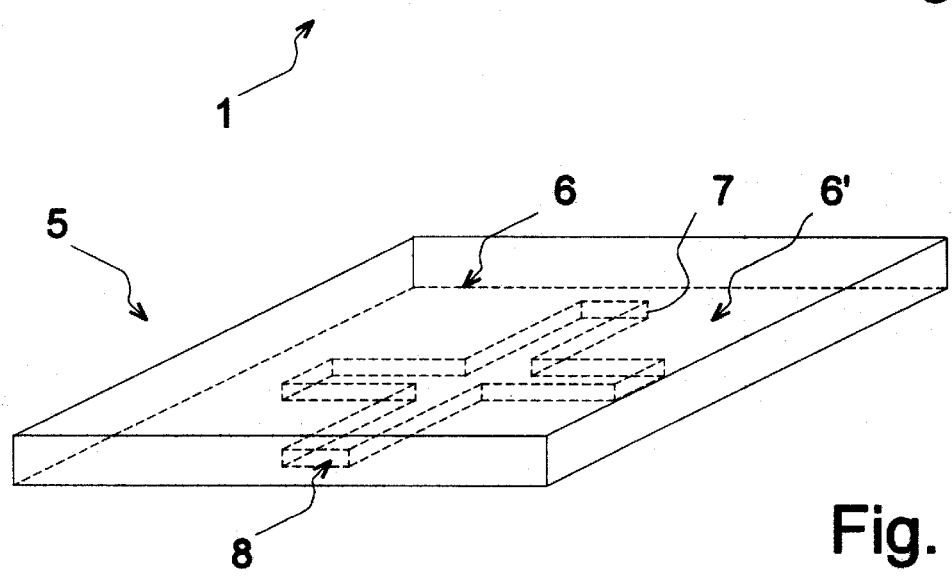

In a third microfabrication step, the result of which is illustrated in FIG. 3, the PDMS layer 5 is peeled off the master element 1. This operation produces a surface 6 of the PDMS layer 5 that was previously—i.e. before peeling off—adjacent to the effective surface of the master element 1 i.e. the surface 3 together with the relief 4. Accordingly, also this surface 6 of the PDMS layer 5 is generally even and bears a negative replica 7 of the relief 4. This negative replica 7 is comprised of elongated prismatic microchannels 8 fitting in shape and corresponding in dimensions to the relief 4 described above. It is a well confirmed and most favorable experimental result that the microchannels 8 obtained in this manner have well defined features and particularly microchannel walls, the excellent smoothness of which reflects the high quality of the surface of the silicon master element 1.

In a fourth microfabrication step, the result of which is illustrated in FIG. 4, holes 9 of about 3 mm diameter are punched through the bulk material of the PDMS layer 5, each in coincidence with a respective end of a microchannel 8 to provide access thereto. The holes 9 are also intended to serve as reservoirs for any fluid that may eventually be introduced into the microchannel system comprised of the microchannels 8 for micro-scale handling, processing and/or investigation of said fluid, which is achieved by each hole 9 being much larger in diameter than the width of the respective microchannel 8 that communicates therewith.

In a fifth microfabrication step, the result of which is illustrated in FIG. 5, the punched PDMS layer 5 is placed on a support element 10 so as to close the microchannel system. To this effect, the support element 10 is fabricated as a thin slab also made of PDMS and provided with a generally even surface 11, and the punched PDMS layer 5 is placed thereon with its generally even surface 6 adjacent to the generally even surface 11 of the support element 10.

When PDMS is used both as the material of the layer 5 and the support element 10, it is a surprising but well confirmed and most favorable experimental result that it suffices to place the generally even surface 6 of the layer 5 (whether punched or not) onto the generally even surface 11 of the support element 10 to obtain between these even surfaces such a good adhesion that a system of hermetically sealed microchannels is readily formed by mere adhesion without applying any external force. For instance, even when pressures up to 1 bar are applied to the fluid eventually contained in the reservoirs and microchannels, the chip still needs not be clamped against the support.

Surprisingly, too, but well confirmed, a system of hermetically sealed microchannels also can be readily formed by mere adhesion without applying any external force when the material of the support element is selected from glass (including fused silica and, by analogy, also quartz) or silicon.

In the above described manner, an improved microstructured device is completed for micro-scale handling, processing and/or investigation of fluid volumes e.g. in the range of about 10 pl to about 100 pl. For instance, fluid (i.e. liquid or gas) separation media can be pipetted and electrodes dipped into the holes or reservoirs, and the microchannels can be filled either by applying vacuum or pressure of up to 1 bar to one or more of the holes or reservoirs. If the microstructured device becomes clogged, the support can be simply peeled off, and the structure rinsed with water and used again after drying in a nitrogen gas stream.

The above-described microstructured device can be used for various experimental purposes. Commercial PDMS is available as a product of high optical quality, transparent above ~230 nm, and exhibits an electrical bulk resistivity that is sufficiently high to prevent the electrical current from flowing through the bulk material. Its relatively low refractive index reduces the amount of reflected excitation light in optical detection schemes. Accordingly, electrophoresis experiments using optical detection schemes are possible both in the ultraviolet range or by laser-induced fluorescence detection e.g. on an inverted microscope set-up, which opens a particularly interesting field of applications based on electrokinetic control of picoliter sample volumes, such as fast separation of DNA restriction fragments, peptide separation, detection of single DNA molecules and the like.

Thus, in the preferred embodiment described above the improved microstructured device according to this invention is comprised of a support element 10 having a substantially even support face 11 and of a microstructured element 5 having a microstructured face 6 provided both with substantially even portions 6' and with recessed portions 7, the even portions 6' being substantially coplanar to a common even surface 6" of the microstructured face 6, the recessed portions 7 being defined on the microstructured face 6 between the even portions 6' adjacent thereto and recessed from the common even surface of the microstructured face 6 into the microstructured element 5, the support face 11 being located substantially adjacent to the microstructured face 6 and cooperating with the recessed portions 7 thereof to define the microchannel system. The microstructured element 5 and, preferably, also the support element 10 are made and formed of poly(dimethylsiloxane).

Further Embodiments

In a further and also useful embodiment of this invention, the support element 10 is made and formed of glass or silicon. Indeed, similar to the instance where the material of the support element is PDMS, it appeared that a system of hermetically sealed microchannels also can be readily formed by mere adhesion without applying any external force when the material of the support element is selected from glass or silicon, being for instance a portion of a microscope slide or a silicon single crystal.

In another, also useful embodiment of this invention that is shown in FIG. 6, both the microstructured element 5 and the support element 10 are actually layers, at least one of which is then supported on a base 12.

It has been described above that the holes 9 are punched through the bulk material of the PDMS microstructured element or layer 5. In a variant that is shown in FIG. 7 the holes 9' are punched throughout the whole structure i.e. the bulk material of the PDMS microstructured element or layer 5, the bulk material of the support element 10 and the base 12. In another variant that is shown in FIG. 8 the holes 9" are punched through the bulk material of the support element 10 and the base 12, whereas no holes are punched through the bulk material of the PDMS microstructured element or layer 5. Thus, various possibilities are available for filling and accessing the microchannel system, which gives the microstructure or microstructured device of this invention a great flexibility of use and operation.

Referring to the second and fifth microfabrication step described above, which are comprised of applying a mixture of fluid precursor of PDMS and its curing agent onto a surface and then curing the mixture, in a variant thereto the mixture can be cast in molds, for instance using a mixture of precursor of PDMS and its curing agent taken in the process of curing at an early or intermediate stage of polymerization where it is still a pasty prepolymer. The same possibilities of variation are also applicable to the fabrication of the support element 10 and/or the base 12. It will be appreciated that, according to circumstances, the above-mentioned mixtures will be applied and/or poured onto the respective surfaces either freely or contained in a mold (not shown).

It will be appreciated that the inherent flexibility of the PDMS polymer will allow for curved surfaces being used instead of planar surfaces throughout the above-described steps and features. For instance, the substantially even support face 11 and the common even surface of the microstructured face 6 must not be constructed as being exclusively planar. Within the scope of this invention it is contemplated to use as well respective surfaces having a cylindrical or spherical curvature.

Thus it shall be understood in relation with this invention that any particular face is considered to be substantially even wherever locally i.e. in the short range the roughness of said face is orders of magnitude smaller and any radius of curvature of said face is orders of magnitude larger than the dimensions of the microstructure i.e. the depth and width of the microchannels in the microchannel system. For short, a substantially even face and its tangential plane shall be considered equivalent. While this is evidently attained with a truly planar face, it shall be understood that this will be attained by equivalence with a face having e.g. a cylindrical or spherical curvature.

We claim:

1. A microstructured device for micro-scale fluid handling, processing and investigation comprising a support element having a substantially even support face and a microstructured element having a microstructured face provided both with substantially even portions and with recessed portions, wherein the even portions are substantially coplanar to a common even surface of the microstructured face, the recessed portions are defined on the microstructured face between the even portions adjacent thereto and recessed from the common even surface of the microstructured face into the microstructured element, the support face is located substantially adjacent to the microstructured face and cooperating with the recessed portions thereof to define a microchannel system appropriate for micro-scale fluid handling, processing and/or investigation, wherein at least the microstructured element is made and formed of poly(dimethylsiloxane) and the recessed portions do not contact any outer edge of the microstructured element.

2. The microstructured device of claim 1, in which both the support element and the microstructured element are made and formed of poly(dimethylsiloxane).

3. The microstructured device of claim 1, in which the support element is made and formed of a material selected from glass or silicon.

4. The microstructured device of claim 1, provided with associated equipment for performing operations selected from microchemical and microphysical equipment operation.

5. The microstructured device of claim 1, wherein the recessed portions have a depth of about 10 to about 90 $\mu$m and a width of about 10 to about 50 $\mu$m.

6. The microstructured device of claim 1, wherein microstructured element has a hole extending in an axial direction to the common even surface and located in communication with said recessed portions.

7. The microstructured device of claim 1, wherein the support element has a hole extending in an axial direction to the support face and located in communication with the recessed portions of the microstructured element.

8. A microstructure for micro-sale fluid handling, processing and/or investigation comprising first and second substantially even layers each having a respective contacting face, said contacting faces being substantially adjacent to each other, said contacting face of said first layer being substantially even and said contacting face of said second layer being provided with recesses that cooperate with said contacting face of said first layer to define a microchannel system, wherein at least said second layer is made and formed of poly(dimethylsiloxane) and the recesses do not contact any outer edge of the second layer.

9. The microstructure of claim 8, in which both the first and second layers are made of poly(dimethylsiloxane).

10. The microstructure of claim 8, in which the first layer is made and formed of a material selected from glass or silicon.

11. The microstructure of claim 8, provided with associated equipment for performing operations selected from microchemical and microphysical equipment operation.

12. The microstructured of claim 8, wherein the recesses have a depth of about 10 to about 90 $\mu$m and a width of about 10 to about 50 $\mu$m.

13. The microstructure of claim 8, wherein second layer has a hole extending in an axial direction to the contacting face and located in communication with said recesses.

14. The microstructure of claim 8, wherein the first layer has a hole extending in an axial direction to the contacting face and located in communication with the recesses of the second layer.

* * * * *